US009176911B2

(12) United States Patent
Davis et al.

(10) Patent No.: US 9,176,911 B2
(45) Date of Patent: Nov. 3, 2015

(54) EXPLICIT FLOW CONTROL FOR IMPLICIT MEMORY REGISTRATION

(71) Applicant: INTEL CORPORATION, Santa Clara, CA (US)

(72) Inventors: Arlin R. Davis, Yamhill, OR (US); Robert J. Woodruff, Banks, OR (US)

(73) Assignee: INTEL CORPORATION, Santa Clara, CA (US)

( * ) Notice: Subject to any disclaimer, the term of this patent is extended or adjusted under 35 U.S.C. 154(b) by 345 days.

(21) Appl. No.: 13/711,122

(22) Filed: Dec. 11, 2012

(65) Prior Publication Data

US 2014/0164545 A1 Jun. 12, 2014

(51) Int. Cl.
G06F 15/167 (2006.01)
G06F 13/28 (2006.01)

(52) U.S. Cl.
CPC ..................... G06F 13/28 (2013.01)

(58) Field of Classification Search
CPC ....................................................... G06F 13/28
USPC ......................................... 709/212, 213, 214
See application file for complete search history.

(56) References Cited

U.S. PATENT DOCUMENTS

| 7,260,631 B1* | 8/2007 | Johnson et al. ................ 709/224 |
| 7,565,454 B2* | 7/2009 | Zuberi ........................... 709/250 |
| 8,122,155 B1* | 2/2012 | Marti ............................. 709/250 |
| 8,131,814 B1 | 3/2012 | Schlansker et al. |
| 8,387,073 B1* | 2/2013 | Micalizzi et al. ............. 719/326 |
| 2005/0131986 A1* | 6/2005 | Haagens et al. ............... 709/201 |
| 2005/0240941 A1* | 10/2005 | Hufferd et al. ................ 719/321 |
| 2008/0104337 A1 | 5/2008 | VelurEunni |
| 2008/0133709 A1 | 6/2008 | Aloni et al. |

(Continued)

FOREIGN PATENT DOCUMENTS

| JP | 2007-206799 A | 8/2007 |
| JP | 2008-172515 A | 7/2008 |

(Continued)

OTHER PUBLICATIONS

International Search Report and Written Opinion received for PCT Patent Application No. PCT/US2013/047599, mailed on Oct. 7, 2013, 15 pages.

(Continued)

Primary Examiner — Mohamed Wasel
(74) Attorney, Agent, or Firm — Law Office of R. Alan Burnett, P.S.

(57) ABSTRACT

Methods, apparatus and systems for facilitating explicit flow control for RDMA transfers using implicit memory registration. To setup an RDMA data transfer, a source RNIC sends a request to allocate a destination buffer at a destination RNIC using implicit memory registration. Under implicit memory registration, the page or pages to be registered are not explicitly identified by the source RNIC, and may correspond to pages that are paged out to virtual memory. As a result, registration of such pages result in page faults, leading to a page fault delay before registration and pinning of the pages is completed. In response to detection of a page fault, the destination RNIC returns an acknowledgment indicating that a page fault delay is occurring. In response to receiving the acknowledgment, the source RNIC temporarily stops sending packets, and does not retransmit packets for which ACKs are not received prior to retransmission timeout expiration.

30 Claims, 5 Drawing Sheets

(56) References Cited

U.S. PATENT DOCUMENTS

| | | |
|---|---|---|
| 2010/0183024 A1 | 7/2010 | Gupta |
| 2011/0066824 A1 | 3/2011 | Bestler |
| 2012/0131124 A1 | 5/2012 | Frey et al. |

FOREIGN PATENT DOCUMENTS

| | | |
|---|---|---|
| JP | 2008-529109 A | 7/2008 |
| KR | 10-2005-0057185 A | 6/2005 |
| WO | 20061076993 A1 | 7/2006 |

OTHER PUBLICATIONS

International Preliminary Report on Patentability and Written Opinion received for PCT Patent Application No. PCT/US2013/047599, mailed on Jun. 25, 2015, 11 pages.

Office Action received for Japanese Patent Application No. 2014-554996, mailed on Sep. 8, 2015, 1 pages of . English Translation and 2 pages of Japanese Office Action.

* cited by examiner

EXPLICIT FLOW CONTROL FOR IMPLICIT MEMORY REGISTRATION

FIELD OF THE INVENTION

The field of invention relates generally to computer networking and, more specifically but not exclusively relates to techniques for performing flow control for RDMA transfers using implicit memory registration.

BACKGROUND INFORMATION

Remote Direct Memory Access (RDMA) is a direct memory access mechanism that enables a computer to access memory from another computer without involving the computers' operating systems. RDMA supports zero-copy networking by enabling a network adapter to transfer data directly to or from application memory, eliminating the need to copy data between application memory and the data buffers in the operating system. Such transfers require no work to be done by CPUs, caches, or context switches, and transfers continue in parallel with other system operations. When an application performs an RDMA Read or Write request, the application data is delivered directly to the network, reducing latency and enabling fast message transfer.

To efficiently communicate with remote systems via user space (i.e., the non-kernel memory space allocated for applications by an operating system), conventional RDMA devices require pre-registered, pre-pinned memory regions for all data transfers over the fabric or network. This consumes large amounts of system memory that could be used by other applications. In order to avoid page faults, memory may often be overallocated to (hopefully) address worst-case traffic conditions. However, under heavy traffic loads even this approach may fail, leading to page faults under which the amount of memory allocated to a pre-pinned memory region is insufficient, resulting in temporary use of virtual memory that is accessed from local or remote secondary storage devices rather than system memory; these devices, such as hard disk drives, have access speeds that are an order of magnitude or more slower than typical system memory. Under conventional approaches, page faults are either transparent to RDMA senders or are otherwise identified indirectly well after the page fault has occurred (e.g., lack of ACKnowledgements within a timeout period may indicate some type of fault or congestion).

There are several RDMA capable network interface cards (RNIC) available on today's market that provide both open source and proprietary methods for implicit memory registration. They all attempt to remove the requirement of pre-pinning memory regions for RDMA transfers. In these cases, the RNIC essentially acts as a memory management unit (MMU) and provides some form of synchronization with system MMU. This MMU synchronization comes in many forms but essentially guarantees that the adapter will participate in all user memory region accesses and tolerate a page fault and page pinning during data transfers. These paging events are indeterminist and can stall the data stream significantly, especially if the system is busy or if the fault requires paging from a local or network attached drive.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for performing flow control for RDMA transfers using implicit memory registration are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments now described, a novel communications method is provided that enables RDMA devices to avoid pre-pinning and better tolerate page-faults by providing explicit data flow acknowledgements on the wire to avoid transfer of unnecessary packets and congestion. This disclosure describes an architecture and method for explicit flow control allowing optimized back pressure to the remote RDMA device or devices.

Explicit Memory Registration and Memory Page Pinning

To better understand and appreciate the advantageous of the embodiments, a comparison to existing conventional approaches is first provided. As discussed above, RDMA enables direct memory access to memory on a remote system in a manner that bypasses the system CPU and operating system. RDMA supports zero-copy networking by enabling an RNIC to transfer data directly to or from application memory (i.e., a memory space in system memory allocated to an application) that is maintained separate for kernel memory used by an operating system, eliminating the need to copy data between application memory and data buffers in kernel memory employed by the operating system. This is facilitated via DMA operations under which a DMA engine on an RNIC is enabled to directly write to and read from data buffers in system memory that have been allocated to the RNICs.

Modern operating system implement memory management by allocating pages in virtual memory, and handling the mappings between logical addresses employed by the virtual memory address space and physical addresses corresponding to physical memory (i.e., system memory hardware addresses). This provides several advantages, including the ability to extend the size of memory beyond the physical memory in the system. Also, each process is run in its own logical address space. Typically, page tables are used to translate the virtual addresses seen by applications into physical addresses used by the hardware to process instructions; the hardware that usually handles this specific translation is a memory management unit (MMU). Each entry in the page table holds a flag indicating whether the corresponding page is in real (i.e., physical) memory or not. If it is in real memory, the page table entry will contain the real memory address at which the page is stored.

When a reference is made to a page by the hardware, if the page table entry for the page indicates that it is not currently in real memory, the hardware raises a page fault exception, invoking the paging supervisor component of the operating system. In response to the page fault, the paging supervisor accesses secondary storage (or whatever storage the virtual memory is mapped to), returns the page that has the virtual address that resulted in the page fault, updates the page tables to reflect the physical location of the virtual address and tells the translation mechanism to restart the request. When all physical memory is already in use, the paging supervisor must free a page in physical memory to hold the swapped-in (aka "paged in") page. At the same time, for each page that is paged in, an existing page in physical memory must be paged out. In essence, paging out a memory page involves copying the data in the memory page from its location in physical memory to a file stored in a secondary storage device. Paging in a memory page accomplished the reverse of paging out—in this case the data corresponding to a page stored in a secondary storage device file is copied to a page in physical memory. The paging supervisor uses one of a variety of page replacement algorithms such as least recently used to determine which page to free. Ideally, pages with low utilization are paged out first, but the result of paging invariably increases memory access latencies. If the situation gets bad enough, disk "thrashing" may occur under which pages are constantly being paged in and out of memory.

As discussed above, a zero copy memory access is designed to bypasses the CPU, meaning it also bypasses the MMU (at least during RDMA memory writes and reads). This creates a problem with respect to normal virtual memory usage, which is addressed through use of explicit memory registration and "pinning" memory pages allocated for RDMA usage.

The RDMA Consortium has published the RDMA Protocol Verbs Specification that describes the behavior of RNIC hardware, firmware, and software as view by the RNIC host (i.e., computer system or platform in which an RNIC is implemented). The behavior description is specified in the form of an RNIC Interface and a set of RNIC Verbs. An RNIC Interface defines the semantics of the RDMA services that are provided by an RNIC that supports the RNIC Verb Specification, and can be implemented through a combination of hardware, firmware, and software. A Verb is an operation what an RNIC Interface is expected to perform. The current draft RDMA Verbs specification is published at http://tools.ietf.org/html/draft-hilland-rddp-verbs-00. As used herein below, the specification is referred to as RDMA Verbs.

RDMA Verbs defines a mechanism for allocating memory called Memory Registration. Memory registration enables access to a Memory Region by a specific RNIC. Binding a Memory Window enables the specific RNIC to access memory represented by that Memory Window. Memory registration provides mechanisms that allow consumers (i.e., the applications that employ RDMA for data transfers) to describe a set of virtually contiguous memory locations or a set of physically contiguous locations to the RI in order to allow the RNIC to access either as a virtually contiguous buffer using a Steering Tag (STag) and a Tagged Offset. Memory registration provides the RNIC with a mapping between a STag and Tagged Offset and a Physical Memory Address. It also provides the RNIC with a description of the access control associated with the memory location. The set of memory locations that have been registered are referred to as a Memory Region. Before an RNIC can use a Memory Region, the resources associated with the Memory Region must be allocated and the Memory Region must be registered with the RNIC.

Under a conventional use of RDMA, the RDMA components at both ends of an RDMA communication channel (i.e., components at a sending and a receiving computer platform, such as a server) allocate (or request allocation from the OS of) buffers in system memory for a given application. A data transfer between applications is performed by copying data in a source buffer and the sender's computer to a destination buffer on the receivers computer. Since the OS, CPU, and MMU are not involved during a transfer, the addresses for the buffers cannot be changed during a transfer. This is accomplished by pinning the memory pages associated with the memory region. Pinned memory pages cannot be swapped to secondary storage. In particular, under conventional usage, data buffers that are accessed directly by peripheral devices that use direct memory access or Input-Output (IO) channels must reside in pinned pages while the IO operation is in progress because such devices and the buses to which they are attached expect to find data buffers located at physical memory addresses; regardless of whether the bus has a memory management unit for IO, transfers cannot be stopped if a page fault occurs and then restarted when the page fault has been processed. Accordingly, not pinning the pages in a zero-copy RDMA system may result in corruption of the contents of memory.

Under explicit memory registration, buffers used for an RDMA data transfer are registered with the RNICs prior to initiating the actual data transfer. This is facilitated, in part, through use of work requests (WRs). Each WR defines: 1) the data transfer operation type (Send, Receive, RDMA Read, RDMA Write); 2) The source buffer for Sends, RDMA Reads and RDMA Writes; and 3) The destination buffer for Receives, RDMA Reads and RDMA Writes. In turn, each of the source and destination buffers has an explicitly defined location (i.e., address range) within a pinned memory region. After registration, these buffers are referred to as "tagged buffers" and are identified by unique STags, as discussed above.

While use of explicit memory registration and pinned memory has historically been the most common way that RDMA is implemented, it has significant drawbacks. In particular, pinning memory takes time and additional memory to set up, reduces the quantity of memory the operating system can allocate to other processes, limits the overall flexibility of the memory system to adapt over time, and may even lead to underutilization of memory if processes unnecessarily pin pages.

Implicit Memory Registration with Conventional Flow Control

In order to address some of the drawbacks of requiring pinned memory regions, an implicit memory registration scheme has been developed. Under an implicit memory registration approach, an RDMA data transfer may be initiated prior to allocation of a destination buffer, where the buffer is allocated on the fly. This may result in a page fault if one or more memory pages allocated for the buffer are paged-out to secondary storage. Under such a page fault event, a memory page or pages must first be paged in to system memory prior to writing data to the destination buffer.

Figure 1:
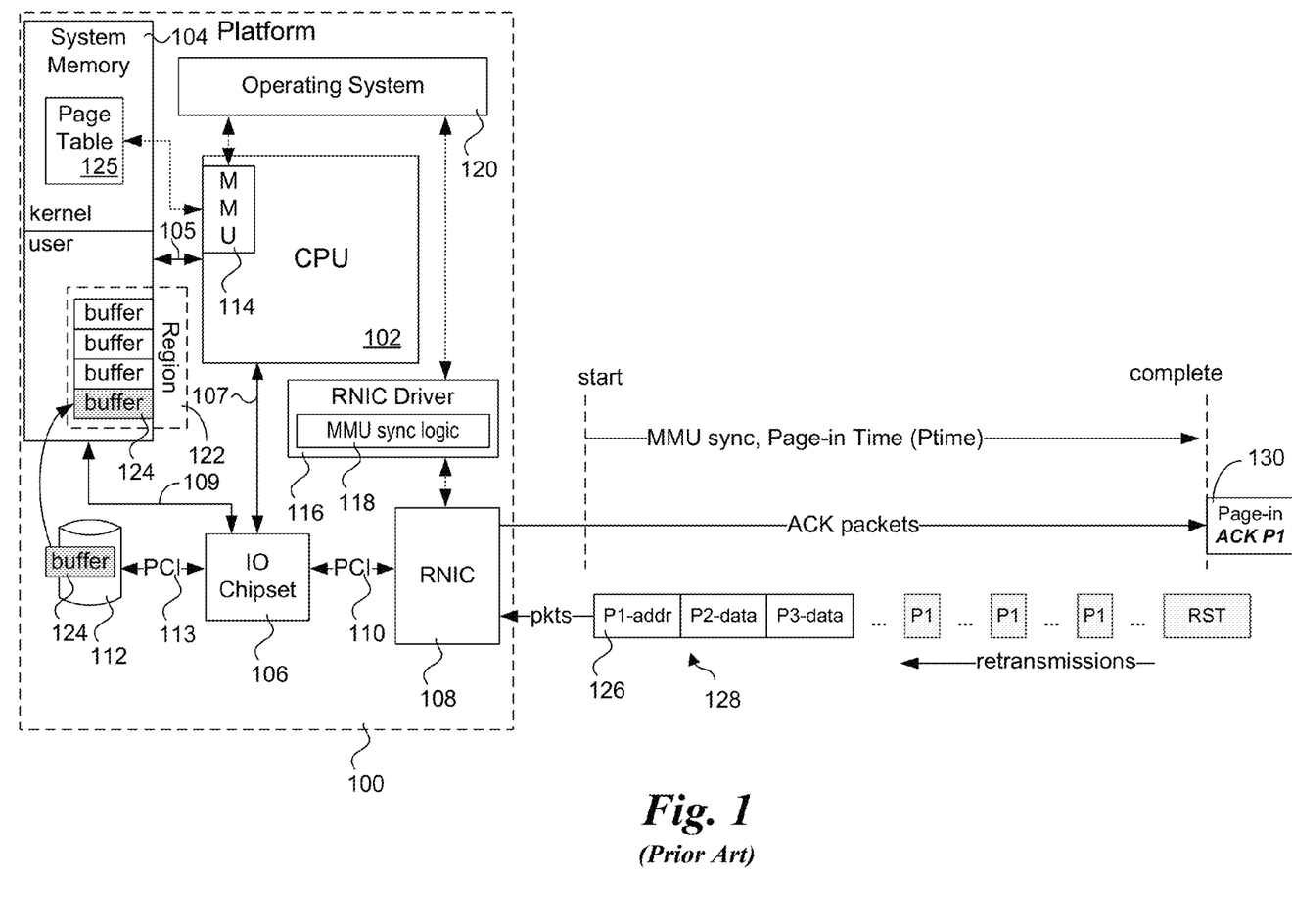
FIG. 1 is a schematic diagram illustrating the result of a page fault in connection with an implicit memory registration for an RDMA destination buffer according to a conventional approach using a standard transport flow-control mechanism.

An example of an architecture configured to support implicit memory registration and conventional flow control in response to page fault events is shown in FIG. 1. The architecture includes a computer platform 100 having a central processing unit (CPU) 102 coupled to system memory 104 and an IO chipset 106 via respective interconnects 105 and 107, while IO chipset 106 is operatively coupled to system memory 104 via an interconnect 109. IO chipset 106 is also connected to an RNIC 108 via a Peripheral Component Interconnect (PCI) interconnect 100, such as a PCI Express (PCIe) link. Similarly, IO chipset 106 is connected to a mass storage device (e.g., hard disk or solid-state disk) comprising secondary storage 112 via a PCI interconnect 113. Platform 100 further includes components for facilitating memory management and memory access, as depicted by a memory management unit 114 on CPU 102, an RNIC driver 116 including MMU sync logic 118, and an operating system (OS) 120.

As discussed above, RDMA-enabled systems support direct memory access to memory on a remote system (e.g., platform 100) in a manner that bypasses the system CPU. This is implemented via DMA operations under which a DMA engine in RNIC 108 is enabled to directly write to and read from buffers in an RDMA memory region 122 in system memory 104. The connection between RNIC 108 and system memory 104 is facilitated via IO chipset 106, interconnect 109, and PCI link 110, wherein IO chipset operates as an IO interface between RNIC 108 and system memory 104.

Since a conventional RDMA memory access bypasses the CPU, it also bypasses the MMU. This is OK when all of the pages for the buffer in memory region 122 are pinned. However, in order to enable buffers to be allocated to pages in virtual memory, a mechanism needs to be provided that both apprises an RNIC of when page faults occur and how the MMU is mapping pages between virtual memory and physical memory once the buffer is paged back in to system memory. This is facilitated through the use of MMU sync logic 116 in RNIC driver 116 in combination with operations performed by MMU 114 and use of a page table 125 in the kernel space of system memory 104.

To initiate an implicit memory registration, a second RDMA host (not shown) sends a buffer registration request message 126 comprising a first packet 'P1' in a packet stream 128 associated with the RDMA data transfer including second and third packets 'P2' and 'P3' containing data to be written to the buffer request to be allocated. In one embodiment the buffer address information in packet P1 includes an address, a length (len) requested for the buffer, and a key value referred to as an "rkey" that is used to validate access rights and provides adapter side address translation. Unlike the case with explicit memory registration, under which memory pages for the destination buffer are pre-registered prior to commencing the RDMA data transfer, implicit memory registration may result in a page fault if the identified location (address) and size (len) of the requested buffer cannot be allocated from an used portion of memory region 122 (or otherwise existing in physical system memory) at the time a request for allocation of a destination buffer is made. An example of this situation is illustrated in FIG. 1, which shows a buffer 124 (corresponding to a requested buffer allocation) being paged in from secondary storage 112 to memory region 122 in response to a page fault event.

Existing RNIC implementations rely on standard transport flow-control mechanisms and existing link level timers to provide back pressure on the wire. Under a page fault event in connection with an implicit memory registration, this may result in premature packet retransmission, congestion, and the termination of a reliable connection. In further detail, FIG. 1 illustrates an example of the result of a page fault in connection with an RDMA data transfer employing an implicit memory registration under a conventional approach using a standard transport flow-control mechanism, and proceeds as follows.

In response to receiving packet P1, an implicit memory registration for the requested buffer is initiated. This results in a memory page fault, and the page of virtual memory in secondary storage must be paged in to physical memory before the any of the data in packet stream 128 may be written to buffer 124. As discussed above, a memory page-in involves latency during which data may not be written into memory; this latency is depicted as Page-in Time (Ptime) in FIG. 1.

In accordance with a common type of standard reliable transport protocol, confirmation of the receipt of a packet or sequence of packets is acknowledged using an ACK message or the like. Under this approach, a source or sending side retransmits packets for which it does not receive an ACK message upon expiration of a retransmission timeout period. Under some protocols, such as TCP, the length of the retransmission timeout period initially begins as a function of a round-trip time calculation for the connection (e.g., set to a some delta above an averaged round trip calculation or otherwise through use of an algorithm employing round-trip time calculations), followed by an exponential timeout back-off sequence under which the timeout period for each subsequent retransmission is doubled. In response to expiration of the timeout, the packet is queued for retransmission. A given packet may be retransmitted several times, until either an ACK for the packet is received by the sender or the connection itself timeouts, requiring a reset.

As further illustrated in FIG. 1, the first ACK message 130 (corresponding to packet P1) is not sent from RNIC 108 until after paging in of the memory pages for the destination buffer has been completed, resulting in a page fault delay of Ptime. During this Ptime page fault delay period either packet P1 or packet sequence P1, P2, and P3 is retransmitted several times (depending on the protocol used; both cases depicted by packets labeled 'P1' with a gray background), followed by a connection reset (RST).

The foregoing conventional approach is fairly wasteful and inefficient. Any time packets have to be retransmitted, a corresponding portion of network bandwidth is lost. In addition, extra buffering and/or operations may be required by one or both of the sending and receiving RNICs whenever packets are retransmitted—particularly if the same packets are retransmitted multiple times during an extended Ptime period.

Implicit Memory Registration with Explicit Flow Control

In accordance with teaching and principles disclosed via the embodiments herein, the foregoing deficiencies are addressed via use of an explicit flow control mechanism that is implemented in response to implicit memory registration page faults and is configured so has to substantially reduce or eliminate the retransmission of packets during Ptime periods.

The teachings and principles also provide enhanced memory management by providing greater granularity with respect to allocation of memory pages for RDMA purposes.

According to one aspect, a more efficient data flow is facilitated by the use of an explicit flow control mechanism that employs a new type of ACK message that is provided as part of the transport wire protocol. During implicit memory registration, resulting in a paging event, this new ACK, called receipt acknowledgement (RACK), is used to acknowledge the receipt of the corresponding RDMA implicit memory registration message and signify a page fault "delay" event is occurring. In addition to performing an acknowledgement function, the RACK includes a calculated back-off time based on standard ACK timer timeout values defined by the underlying fabric or network protocol. As a result, the transport engine in the remote RNIC will temporarily adjust the ACK timeout for the connection's data stream until a normal ACK is received. If the back-off is too significant, the sending RNIC may choose to abort. Once the memory page fault page-in is complete and the page is pinned, a normal ACK will be sent and the remote RNIC will resume transmitting based on the original ACK timeout set for the reliable data channel.

Figure 2:
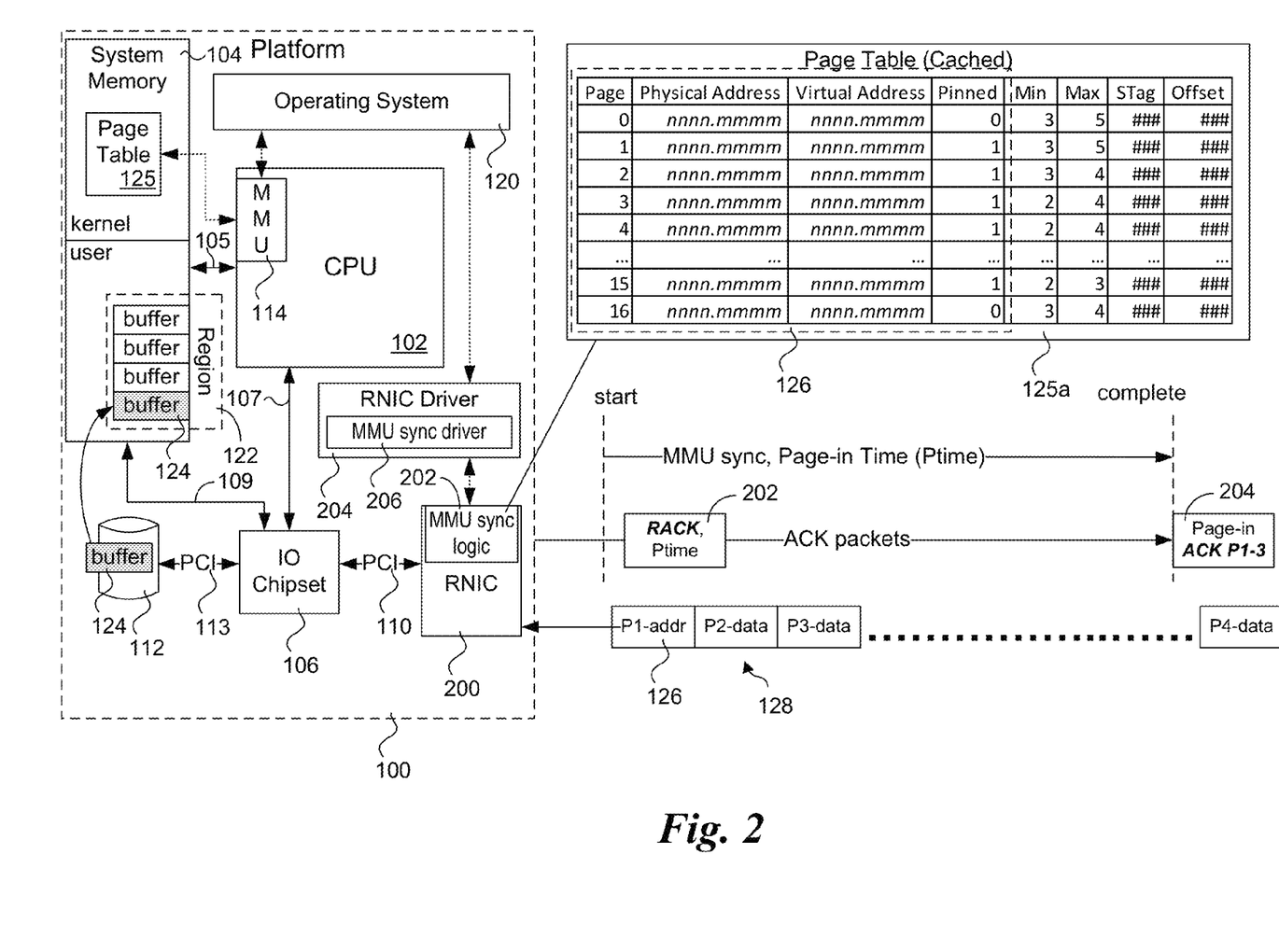
FIG. 2 is a schematic diagram illustrating how a page fault in connection with an implicit memory registration for an RDMA destination buffer is handled using explicit flow control, according to one embodiment.

An exemplary use of a RACK acknowledgement is shown in FIG. 2, which depicts a platform 100a having similar components to platform 100 sharing common reference numbers. Differences between platforms 100 and 100a include a modified RNIC 200 including hardware-based MMU sync logic 202 and an RNIC driver 204 including an MMU sync driver 206.

As before, a stream of packets P1, P2, and P3 are sent from a remote sending RNIC (not shown) and received by RNIC 200, resulting in a memory page fault event. In response to detection of the memory fault, RNIC 200 returns a RACK message 206 including a Ptime value. The Ptime value corresponds to a back off time during which the sending RNIC is requested to not send (i.e., back off sending) an additional packets. After the faulting memory page has been paged in to system memory 104 (thus allocating buffer space for data in packets P2 and P3, RNIC 200 returns a conventional ACK message 208 indicating packets P1, P2, and P3 have been successfully received. At this point, the sending RNIC resumes sending packets corresponding to the packet stream, as depicted by a data packet labeled 'P4-data.'

To support explicit flow control, MMU sync logic 202 are MMU sync driver 206 are configured such that MMU sync logic will synchronize with the system MMU 114 and discern the current state of memory mappings related to RDMA memory usage (i.e., as depicted, in part, by pages allocated for memory region 120). In one embodiment, MMU sync logic 202 sets a bit in its local cached page table 125a signifying pinning states of the active RDMA address space in system memory 104. As showed by the dashed outline box 126, this portion of local cached page table 125a corresponds to page table information that is synchronized with corresponding page table information maintained by MMU 114 that pertain to RDMA buffer usage. In some embodiments, the local cached page table also includes min/max times of preceding paging events for dynamic control of data streams. When an RDMA write or read operation arrives, the RNIC checks the mapping state of the RDMA address using its cached page table entries. If it's mapped and the page is pinned, the RNIC will respond immediately with normal ACK's. If it is not pinned, the RNIC will return a RACK message and request page pinning via MMU 114. The RACK message may include back-off times which in one embodiment are based on the cached min/max times of previous paging events. Once the data flow has begun, it is assumed pages remain pinned for the life of the transfers and they will not page-out or be moved. This frozen mapping state is important due to the in-order requirements of RDMA data transfers.

Figure 3:
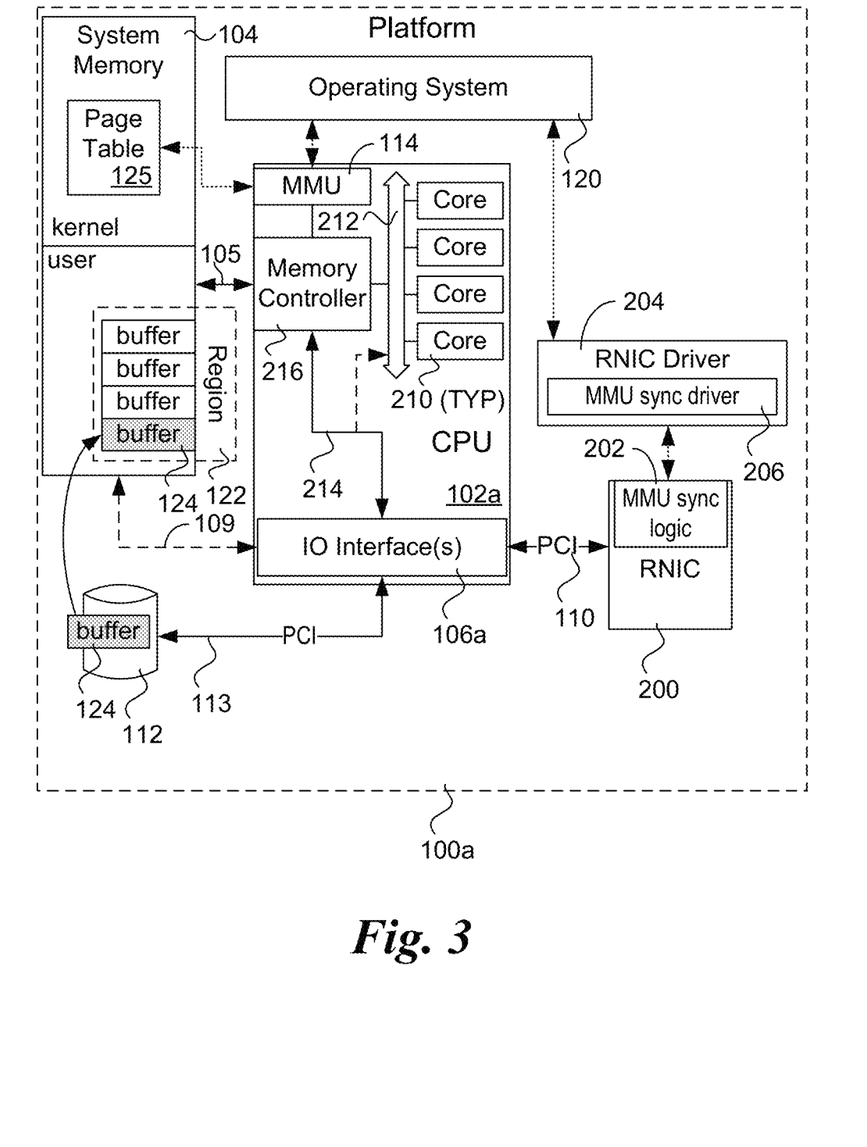
FIG. 3 is a schematic diagram illustrating a platform configuration that may be used to implement aspects of the embodiments described herein.

FIG. 3 shows an architecture for a platform 100a that is a variation of platform 100 that replaces CPU 102 and IO chipset 106 with a CPU 102a including an integrated set of IO interfaces 106a that are configured to perform similar operations to those performed by IO chipset 106 discussed above. In one embodiment, CPU 102a comprises a System on a Chip (SoC) architecture, including a plurality of processor cores 210 and multiple interconnects (such as exemplified by an coherent interconnect 212) connecting various components and logic on the SoC in communication. In general, IO interfaces 106a is representative of one or more IO interfaces that may be configured to support access to system memory 104, secondary storage 112 and RNIC 200, either directly or via another component. As depicted, in one embodiment at least a portion of the IO interfaces are configured as PCI-based interfaces that support PCI interconnects, such as PCIe interfaces.

In some embodiments, DMA data communication between RNIC 200 and system memory 104 may involve an additional internal interface and interconnect 214 between a memory controller 216 (used to access system memory 104) on CPU 102a and IO Interfaces 106a. In respective embodiments, this internal interconnect comprises an Intel® QuickPath Interconnect® (QPI) or an Intel® Keizer Technology Interconnect® (KTI). In one embodiment, cores 210 and memory controller 216 are coupled to a ring interconnect employing QPI or KTI interconnect wiring and employing the QPI or KTI protocol, and an IO interface in IO interfaces 106a is configured to receive PCIe memory write packets read requests and convert them to QPI or KTI memory write transactions and memory read transactions. Although the messages/write packets for these DMA operations go through CPU 102a, they bypass cores 210 and do not involve use of an operating system running on platform 100a.

Figure 4:
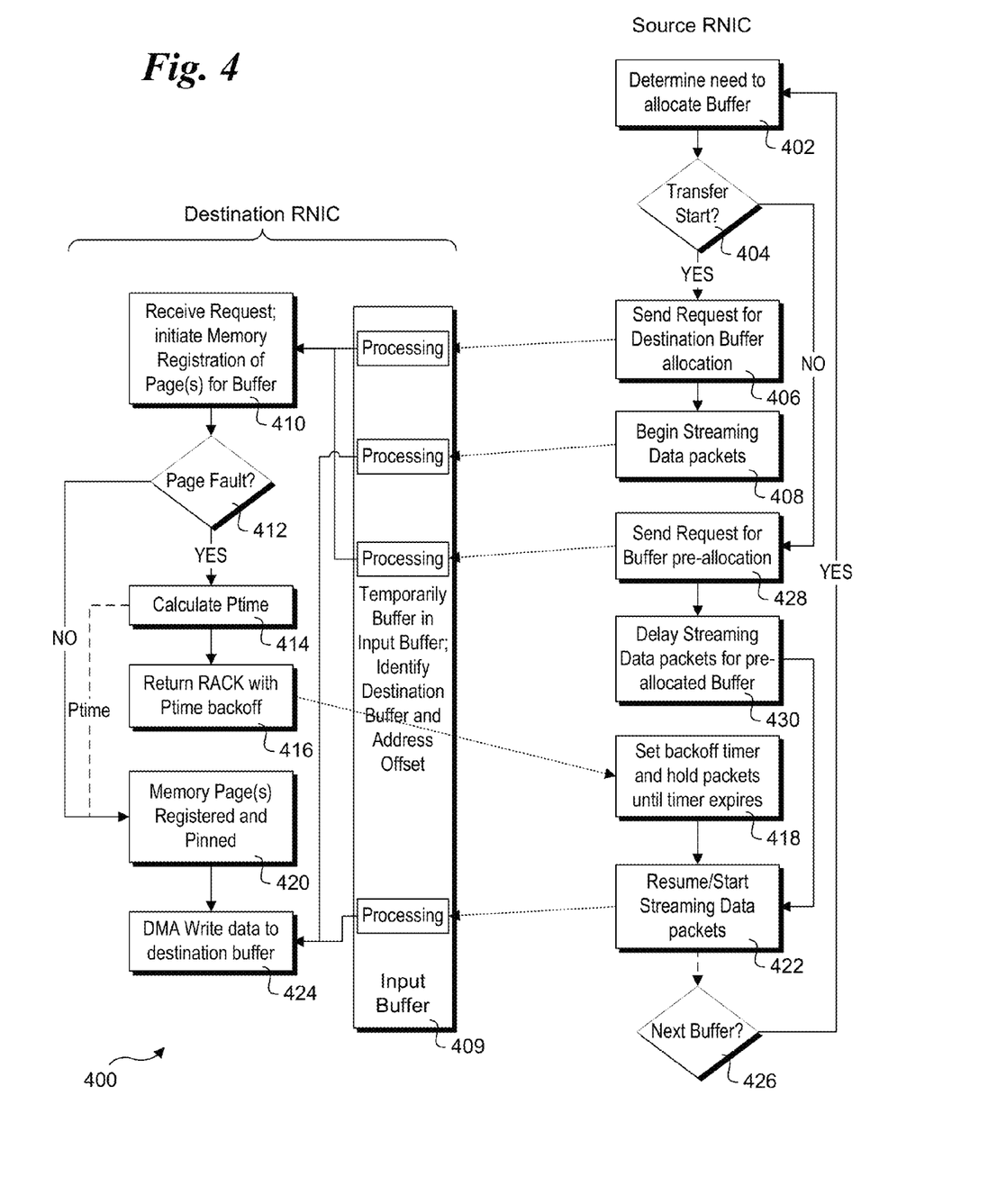
FIG. 4 is a message flow diagram illustrating aspects of an RDMA data transfer employing implicit memory registration and pipelined buffer pre-allocation, according to one embodiment.

FIG. 400 is a method flow and processing diagram illustrating various operations and logic performed by a source RNIC and a Destination RNIC during an RDMA data transfer employing aspects of the explicit flow control mechanism described above. The process on the source RNIC begins in a block 402 in which a determination is made a buffer needs to be allocated for an upcoming RDMA data transfer. In a block 404 a determination is made to whether the buffer allocation corresponds to the start of a data transfer or is made in connection with a dynamic additional buffer allocation that occurs during the data transfer.

If the buffer allocation corresponds to the start of a transfer, the source RNIC sends a request for a destination buffer allocation in a block 406, and begins streaming packets in a block 408. The packets corresponding to both of these operations are received at an input buffer 409 of the destination RNIC, where they are processed using packet processing logic and RDMA processing logic, as depicted by the processing block shown in input buffer 409.

As shown in a block 410, the destination RNIC receives the destination buffer request and initiates registration of one or more memory pages to be used for the buffer. In connection with the memory registration operation, a page fault may result if the corresponding page is paged-out, as discussed above. Accordingly, a determination is made in decision block 412 to whether a page fault occurs. If a page fault occurs, the logic proceeds to a block 414 in which a Ptime backoff calculation is performed. As discusses above, in one embodiment this calculation is based on prior page fault events, such as minimum and maximum durations of such events. As shown in cached page table 125a, there may be minimum and maximum values for each memory page. Optionally, minimum and maximum values and/or other statistical data may be maintained for a group of memory pages or the entire memory region. The Ptime calculation may also include consideration of the link round trip time or a value derived thereform.

Once the Ptime is calculated, a RACK acknowledgment message including a Ptime backoff is sent in a block 416 from the destination RNIC to the source RNIC. In response to receiving the RACK message, the source RNIC sets a backoff time and holds of sending additional packets until the time expires, as shown in a block 418. Upon expiration of the time, streaming of packets from the source RNIC to the destination RNIC is resumed in a block 422.

During the Ptime period, one or more pages of memory that are allocated for the destination buffer are paged in to system memory, whereupon they are registered and pinned, as depicted in a block 420. At this stage, the destination buffer is ready to receive data, as depicted by DMA write data to buffer in a block 424. In addition to processing streamed packets from block 422, the previously streamed packets from block 406 that have been temporarily buffered in input buffer 409 are also processed. In accordance with the RDMA specification, the packets are streamed in order and written in their streamed order. If necessary, the source RNIC may have to resend packets from among the packets sent in block 406 if they are dropped by the destination RNIC.

The source and destination RNICs may also be configured to support dynamic allocation of buffers (e.g., using a pipeline approach) corresponding to the same data transfer (i.e., the same work request). Under one embodiment, the request for a buffer (or, additional buffer space) is made in advance of an anticipated need for the buffer such that if a page fault event delays registration of a memory page or pages for the buffer the memory page(s) will still be registered and pinned prior to being needed. Accordingly, there is no disruption in the data transfer.

Operations and logic supporting this functionality are depicted in FIG. 4, beginning with a determination in a decision block 426 as to whether a next buffer is to be allocated. If the answer is YES, the logic returns to block 402 to begin the buffer allocation process. However, in this case, the allocation of a buffer does not corresponds to that start of a data transfer, and thus the answer to decision block 404 is NO, with the logic proceeding to a block 428 in which a request for pre-allocation of a buffer is sent to the destination RNIC. In one embodiment, a request for allocation of a buffer or pre-allocation of a buffer are one in the same—from the perspective of the destination RNIC they appear identical. In another embodiment, a buffer pre-allocation request is marked with a flag or a like to inform the destination RNIC of what type of buffer allocation request it is. Accordingly, in one embodiment the destination RNIC will not return a RACK message in response to detection of a page fault event, since the source RNIC is not planning on streaming packets to be stored in the buffer (to be allocated) until after the buffer is projected to be registered in pinned (assuming a page fault will result). Optionally, the destination RNIC may return an—RACK that will simply be ignored by the Source RNIC. During the time period corresponding to the anticipated page fault delay, the source RNIC does begin streaming the portion of data that is to be stored in the pre-allocated buffer, as depicted by a block 430. Preferably, the timing of the buffer pre-allocation will be such that a continuous stream of packets for the data transfer proceed uninterrupted. At the same time, it is preferred the buffer not be pre-allocated significantly in advance of when it will be needed such that utilization of the memory space used for RDMA buffering is made more efficient.

In addition to the foregoing embodiments, other methods may be implemented to optimize the data flow and limit the use of back off periods. For example, an RNIC adapter could request pinning on segments of the RDMA memory regions instead of the entire region as long as the order is preserved and subsequent pinning is schedule ahead of arriving data (similar to the pipelining example above). As another option, a protocol could also provide reliable connection attributes during setup that signifies the use of implicit memory registration. This would tell the source RNIC to delay start of the data stream until a first ACK is received, or RACK Ptime has expired, when starting a new RDMA transfer operation.

Figure 5:
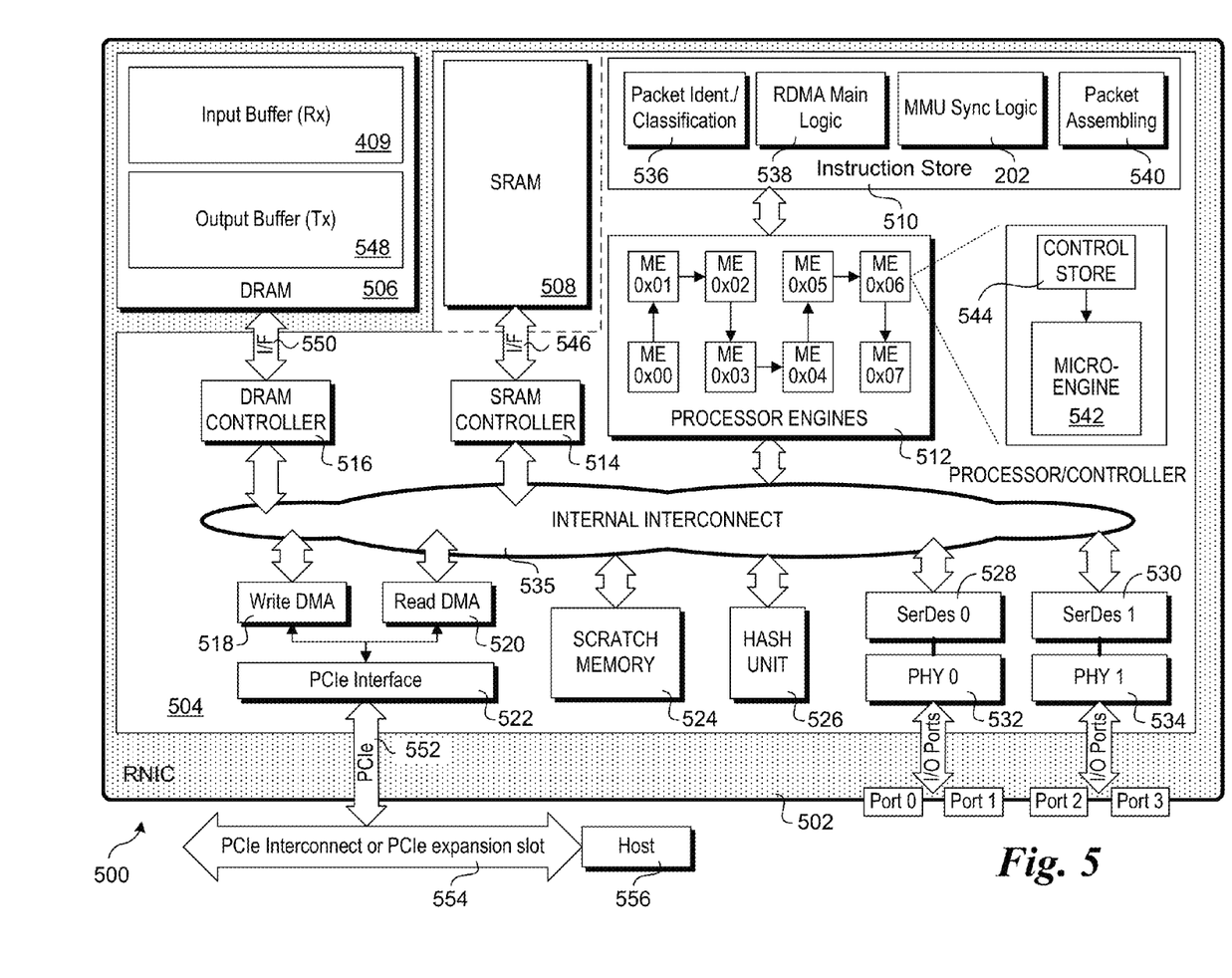
FIG. 5 is a schematic diagram illustrating an architecture for an RNIC that may be used for implementing aspects of the embodiments disclosed herein.

An exemplary system architecture for an RNIC 500 is shown in FIG. 5. RNIC 500 includes a NIC system board 502 on which a network processor/controller 504, and memory comprising Dynamic Random Access Memory (DRAM) 506 and SRAM 508 are mounted. In one embodiment, SRAM 508 is integrated on processor/controller 504. Under various embodiments. NIC system board 502 is representative of an Ethernet controller card, a daughter board, a multi-chip module board or substrate, or it may be part of a computer system board, such as a main board or motherboard for a computer server. Processor/controller 504 is representative of Ethernet processing and/or control unit, and may be embodied in various forms, including as an Ethernet controller chip or a network processor unit (NPU).

In the illustrated embodiment, processor/controller 504 includes an instruction store 510, a cluster of processor engines 512, an SRAM controller 514, a DRAM controller 516, a Write DMA block 518, a Read DMA block 520, a PCIe interface 522, a scratch memory 524, a hash unit 526, Serializer/Deserializers (SerDes) 528 and 530, and Physical Layer (PHY) interfaces 532 and 534. Each of the components is interconnected to one or more other components via applicable interconnect structure and logic that is collectively depicted as an internal interconnect cloud 535.

Instruction store 510 includes various instructions that are executed by processor engines cluster 512, including packet identification/classification instructions 536, RDMA main logic 538, MMU sync logic 202 and packet assembling logic 540. Processor engines cluster 512 includes a plurality of microengines 542, each coupled to a local control store 544. Under one embodiment, various operations such as packet identification and classification are performed using a pipelined architecture, such as illustrated in FIG. 5, with each microengine performing an associated operation in the pipeline. As an alternative, processor engines cluster 512 is representative of one or more processor cores in a central processing unit or controller. As yet another option, the combination of processor engines 512 and instruction store 510 may be implemented as embedded logic, such as via a Field Programmable Gate Array (FPGA) or the like.

In one embodiment, instruction store 510 is implemented as an on-chip store, such as depicted in FIG. 5. Optionally, a portion or all of the instructions depicted in instruction store 510 may stored in SRAM 508 (if off-chip) and accessed using SRAM controller 514 via an interface 546. SRAM 508 may also be used for storing selected data and/or instructions relating to packet processing operations, as well as cache page table entries.

DRAM 506 is used to for implementing one or more Input Buffers 409 and one or more Output Buffers 548, and is accessed using DRAM controller 516 via an interface 550.

Write DMA block 518 and Read DMA block 520 are respectively configured to support DMA Write and Read operations in accordance with the embodiments described herein. In the illustrated embodiment, DMA communication between DRAM 506 and a platform host circuitry is facilitated over PCIe interface 522 via a PCIe link 552 coupled to a PCIe interconnect or PCIe expansion slot 554, enabling DMA Write and Read transfers between DRAM 506 and system memory for a host 556 using the PCIe protocol.

Scratch memory 524 and hash unit 526 are illustrative of components employed by NICs for facilitating scratch memory and hashing operations relating to packet processing. For example, a hash operation may be implemented for deriving flow IDs and for packet identification.

PHYs 532 and 534 facilitate Physical layer operations for the RNIC, and operate as a bridge between the digital domain employed by the RNIC logic and components and the analog domain employed for transmitting data via electrical, optical or wired signals. For example, in the illustrated embodiment of FIG. 5, each of PHYs 532 and 534 is coupled to a pair of I/O ports configured to send electrical signals over a wire cable such as a Cat5e or Cat6 cable. Optical and wireless signal embodiments would employ additional circuitry and interfaces for facilitating connection via optical and wireless signals (not shown). In conjunction with PHY operations, SerDes 528 and 530 are used to serialize output packet streams and deserialize inbound packet streams.

In addition to the instructions shown in instruction store 510, other instructions may be implemented via execution of processor engines 512 or other processing means to facilitate additional operations. For example, in one embodiment, NIC 500 is configured to implement a TCP/IP stack on the RNIC itself. RNIC 500 may also be configured to facilitate TCP operations in a manner that is offloaded from the Operating System TCP facilities, whereby once a packet is sent outbound, RNIC 500 is responsible for processing an ACK message and resending the packet if an ACK message is not received within an applicable TCP timeout period.

RDMA main logic 536 comprises instructions and logic for facilitating RDMA data transfer operations, which may include conventional RDMA operations in addition to the augmentation to RDMA data transfer processes described herein. MMU sync logic 202 is configured to implement the MMY sync logic and operations described herein.

In addition to support for RDMA operations, an RNIC may be configured perform conventional NIC operations, including operation relating to packet forwarding. Accordingly, RNIC 500 may be configured to store data for facilitating packet identification and classification, including forwarding filters and rules either locally or using a Memory-Mapped IO (MMIO) address space in system memory. When stored locally, this data may be stored in either DRAM 506 or SRAM 508. Data stored in a MMIO address space may be accessed by RNIC 500 via Read DMA operations. Generally, setting up MMIO address space mapping may be facilitated by an RNIC device driver in coordination with the operating system. The RNIC device driver may also be configured to enable instructions in instruction store 510 to be updated via the operating system. Optionally, the instructions in instruction store may comprise firmware instructions that are stored in non-volatile memory, such as Flash memory, which may either be integrated on processor/controller 504 or mounted to NIC system board 502 (not shown).

Generally, aspects of the embodiments disclosed herein may apply to any existing or future network protocol that supports RDMA implementations and flow control. These include but are not limited to TCP or other reliable transport protocols over Ethernet, iWARP, and Infiniband. Moreover, any existing physical transport layer used to facilitate the physical transmission of communication may be employed, including wired, optical, and wireless transmissions.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As presented in the text and drawing herein, aspects of some embodiments may be implemented in an RNIC that includes one or more integrated components (e.g., semiconductor chips) via which logic for facilitating RDMA-related operations is implemented. Moreover, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

In addition, aspects of some embodiments herein may be facilitated by corresponding software and/or firmware components and applications, such as but not limited to RNIC drivers, MMU sync drivers, and firmware implemented on RNICs. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
   receiving, at a first Remote Direct Memory Access (RDMA) Network Interface Controller (RNIC), a first message containing a request for registration of memory for use as a destination buffer to be employed in connection with an RDMA data transfer from a second RNIC to the first RNIC using a reliable transport protocol; and
   in response to a memory registration operation relating to the request and resulting in a page fault event,
   sending a first acknowledgement message to the second RNIC acknowledging the first message has been received and containing information indicating a page fault delay event is occurring.

2. The method of claim 1, wherein the first acknowledgement message includes a backoff time and comprises a request for the second RNIC to not send packets corresponding to the RDMA data transfer until the backoff time has expired.

3. The method of claim 1, further comprising:
   receiving a plurality of packets from the second RNIC during the page fault delay;
   temporarily buffering the packets on the first RNIC while the page fault delay is occurring; and,
   after the page fault delay has completed,
   sending a second acknowledgement message to the second RNIC indicating the plurality of packets have been received.

4. The method of claim 1, wherein the first RNIC is installed in a host platform having system memory used for RDMA buffers and a processor including a memory management unit (MMU) used to manage access to the system memory, and wherein an operating system that employs virtual memory is running on the host platform, the method further comprising implementing a mechanism to synchronize a portion of page table information employed by the MMU for pages allocated to RDMA destination buffers with a cached copy of the page table information accessed locally by the first RNIC.

5. The method of claim 4, wherein memory to be registered corresponding to the request comprises one or more memory pages, the method further comprising providing indicia to the MMU requesting pinning of the one or more memory pages.

6. The method of claim 5, further comprising providing indicia to the MMU after the RDMA data transfer has been completed identifying the one or more memory pages may be unpinned.

7. The method of claim 1, wherein the first RNIC is installed in a host platform having system memory used for RDMA buffers and a processor including a memory management unit (MMU) used to manage access to the system memory, and wherein an operating system that employs virtual memory is running on the host platform and employs a paging table in kernel memory, the method further comprising updating page table entries in the paging table via the first RNIC to identify corresponding memory pages are pinned.

8. The method of claim 7, further comprising updating page table entries via the first RNIC to identify corresponding memory pages are unpinned after usage of an RDMA destination buffer employing the memory pages is complete.

9. The method of claim 1, wherein the first RNIC is installed in a host platform having system memory used for RDMA buffers and a processor including a memory management unit (MMU) used to manage access to the system memory, and wherein an operating system that employs virtual memory is running on the host platform and employs a paging table in kernel memory, the method further comprising detecting, via the first RNIC, that the page fault has occurred.

10. The method of claim 1, further comprising determining that a page fault will result prior to attempting to register memory to be used for the destination buffer.

11. The method of claim 1, further comprising:
   receiving a request to allocate a destination buffer or extend the size of an existing destination buffer during an ongoing RDMA data transfer corresponding to a single RDMA work request; and
   allocating the destination buffer or extending the size of an existing destination buffer using one or more pages of memory that are currently paged out, wherein the one or more pages are paged in, registered, and pinned.

12. The method of claim 1, wherein the request to allocate the destination buffer or extend the size of an existing destination buffer contains indicia identifying it as a buffer pre-allocation request and the use of a paged-out page of memory results in a page fault, the method further comprising not sending an acknowledgment message to the second RNIC including a backoff time in response to the page fault.

13. An apparatus, comprising:
a network interface, configured to send and receive packetized data using a reliable transport protocol; and
Remote Direct Memory Access (RDMA) logic, configured to be employed to facilitate performing operations when the apparatus is operating including,
receiving a first message containing a request for registration of memory for use as a destination buffer to be employed in connection with an RDMA data transfer from a remote apparatus using a reliable transport protocol; and
in response to a memory registration operation relating to the request and resulting in a page fault event,
sending a first acknowledgement message to the second apparatus acknowledging the first message has been received and containing information indicating a page fault delay event is occurring, wherein the first acknowledgement message includes a backoff time and comprises a request for the remote apparatus to not send packets corresponding to the RDMA data transfer until the backoff time has expired.

14. The apparatus of claim 13, wherein the apparatus comprises an RDMA-enabled Network Interface Controller (RNIC).

15. The apparatus of claim 13, wherein the apparatus is configured to be installed in a host platform having system memory used for RDMA buffers and a processor including a memory management unit (MMU) used to manage access to the system memory, wherein, during operation of the host platform an operating system that employs virtual memory is running on the host platform, and wherein the apparatus further comprises a mechanism to synchronize a portion of page table information employed by the MMU for pages allocated to RDMA destination buffers with a cached copy of the page table information accessed locally by the first RNIC.

16. The apparatus of claim 13, wherein the apparatus is configured to be installed in a host platform having system memory used for RDMA buffers and a processor including a memory management unit (MMU) used to manage access to the system memory, wherein, during operation of the host platform an operating system that employs virtual memory is running on the host platform and employs a paging table in kernel memory, and wherein the apparatus is further configured to update page table entries in the paging table to identify corresponding memory pages are pinned.

17. The apparatus of claim 13, wherein the apparatus is further configured to perform operations, when operating, comprising:
receiving a request to dynamically allocate a destination buffer or extend the size of an existing destination buffer during an ongoing RDMA data transfer corresponding to a single RDMA work request; and
allocating the destination buffer or extending the size of an existing destination buffer using one or more pages of memory that are currently paged out, wherein the one or more pages are paged in, registered, and pinned.

18. A method, comprising:
sending, from a first Remote Direct Memory Access (RDMA) Network Interface Controller (RNIC) to a second RNIC, a first message containing a request for registration of memory for use as a destination buffer to be employed in connection with an RDMA data transfer from the first RNIC to the second RNIC using a reliable transport protocol;
streaming a first plurality of packets from the first RNIC to the second RNIC corresponding to the RDMA data transfer;
receiving a first acknowledgement message from the second RNIC acknowledging the first message has been received and containing information indicating a page fault delay event is occurring and a backoff time; and in response thereto,
employing the backoff time for use by a backoff timer and not sending any additional packets for the RDMA data transfer from the first RNIC to the second NIC until the backoff timer has expired.

19. The method of claim 18, further comprising not retransmitting any of the first plurality of packets during a backoff period associated with use of the backoff time.

20. The method of claim 18, wherein the RDMA data transfer corresponds to an RDMA work request to transfer a file having a file size, and wherein the destination buffer for which registration of memory is request in the first message has a size that is less than the file size and comprises a first destination buffer, the method further comprising:
transmitting a stream of packets from the first RNIC to the second RNIC corresponding to an RDMA data transfer of the file;
during the RDMA data transfer of the file, sending a second message containing a request for implicit registration of memory for use as a second destination buffer to be employed in connection with the RDMA data transfer of the file.

21. The method of claim 20, wherein the second message is sent in advance of the second destination buffer being needed using an advance time period that is greater than a projected page fault delay that might result during the implicit registration of the memory for the second destination buffer.

22. An apparatus, comprising:
a network interface, configured to send and receive packetized data using a reliable transport protocol; and
Remote Direct Memory Access (RDMA) logic, configured to be employed to facilitate performing operations when the apparatus is operating including,
sending, from the apparatus to a remote apparatus, a first message containing a request for registration of memory for use as a destination buffer to be employed in connection with an RDMA data transfer from the apparatus to the remote apparatus using a reliable transport protocol;
streaming a first plurality of packets corresponding to the RDMA data transfer to the remote apparatus;
receiving a first acknowledgement message from the remote apparatus acknowledging the first message has been received and containing information indicating a page fault delay event is occurring and a backoff time; and in response thereto,
employing the backoff time for use by a backoff timer and not sending any additional packets for the RDMA data transfer to the remote apparatus until the backoff timer has expired.

23. The apparatus of claim 22, wherein the apparatus is further configured to not retransmit any of the first plurality of packets during a backoff period associated with use of the backoff time.

24. The apparatus of claim 22, wherein the RDMA data transfer corresponds to an RDMA work request to transfer a file having a file size, and wherein the destination buffer for which registration of memory is request in the first message has a size that is less than the file size and comprises a first destination buffer, the method further comprising:

transmitting a stream of packets to the remote apparatus corresponding to an RDMA data transfer of the file;

during the RDMA data transfer of the file, sending a second message containing a request for implicit registration of memory for use as a second destination buffer to be employed in connection with the RDMA data transfer of the file.

25. The apparatus of claim 24, wherein the second message is sent in advance of the second destination buffer being needed using an advance time period that is greater than a projected page fault delay that might result during the implicit registration of the memory for the second destination buffer.

26. A computer system, comprising:

system memory comprising a plurality of memory pages;

a processor, operatively coupled to the system memory, including a memory management unit (MMU) used for managing access to pages of system memory;

a secondary storage device;

an Input Output (JO) interface component, operatively coupled to or integrated in the processor and operatively coupled to the memory and the secondary storage device; and a network adaptor, operatively coupled to the IO interface component and including logic configured to interface with the MMU via a driver, wherein the network adaptor further including logic for performing Remote Direct Memory Access (RDMA) network operations including, receiving, from a remote computer system, a first message containing a request for registration of a memory buffer to be employed for storing data corresponding to a first RDMA data transfer from the remote computer system to the computer system using a reliable transport protocol;

in connection with registering memory to be employed for the buffer, identifying a page fault has resulted; and sending a first acknowledgement message to the remote computer system acknowledging the first message has been received and containing information indicating a page fault delay event is occurring.

27. The computer system of claim 26, wherein the first acknowledgement message includes a backoff time and comprises a request for the remote computer system to not send packets corresponding to the first RDMA data transfer until the backoff time has expired.

28. The system of claim 26, wherein the logic used to interface with the MMU is configured to synchronize a portion of page table information employed by the MMU for pages allocated to RDMA destination buffers with a cached copy of the page table information accessed locally by the network adaptor.

29. The system of claim 26, wherein the network adaptor is operatively coupled to the IO interface component via a Peripheral Component Interconnect Express (PCIe) link.

30. The system of claim 26, wherein the network adaptor is figured configured to perform operations, comprising:

sending a second message containing a request for registration of memory for use as a destination buffer to be employed in connection with a second RDMA data transfer from the system to the remote apparatus using a reliable transport protocol;

streaming a first plurality of packets corresponding to the second RDMA data transfer to the remote apparatus;

receiving a first acknowledgement message from the remote apparatus acknowledging the second message has been received and containing information indicating a page fault delay event is occurring and a backoff time; and in response thereto, employing the backoff time for use by a backoff timer and not sending any additional packets for the second RDMA data transfer to the remote apparatus until the backoff timer has expired.

* * * * *